United States Patent [19]

Fischer

[11] Patent Number: 5,048,792

[45] Date of Patent: Sep. 17, 1991

[54] MIXING FAUCET ROTARY BRAKE

[75] Inventor: Frank S. Fischer, Lorain, Ohio

[73] Assignee: Moen Incorporated, Elyria, Ohio

[21] Appl. No.: 542,693

[22] Filed: Jun. 25, 1990

[51] Int. Cl.[5] .............................................. F16K 35/04
[52] U.S. Cl. ..................................... 251/297; 137/597;
137/625.17; 251/288
[58] Field of Search ........................... 137/597, 628.17;
251/288, 297

[56] References Cited

U.S. PATENT DOCUMENTS

| 3,602,340 | 8/1971 | Budzich | 281/297 X |
| 3,929,317 | 12/1975 | Cohn et al. | 251/288 X |
| 4,073,308 | 2/1978 | Stith | 251/297 X |
| 4,219,184 | 8/1980 | Crawford | 231/297 |
| 4,782,853 | 11/1988 | Moen | 137/625.17 X |

Primary Examiner—Gerald A. Michalsky
Attorney, Agent, or Firm—Kinzer, Plyer, Dorn, McEachran & Jambor

[57] ABSTRACT

A control valve for use in plumbing fittings such as shower control valves or the like includes a housing, a valve member within the housing, and a handle attached to the rotatable stem of the valve member. The handle and valve stem are rotatable relative to the housing to control discharge from the valve. There are cooperating stops on the handle and housing limiting rotation of the valve stem. The improvement comprises a device for retarding rotational movement of the handle and stem relative to the housing.

7 Claims, 2 Drawing Sheets

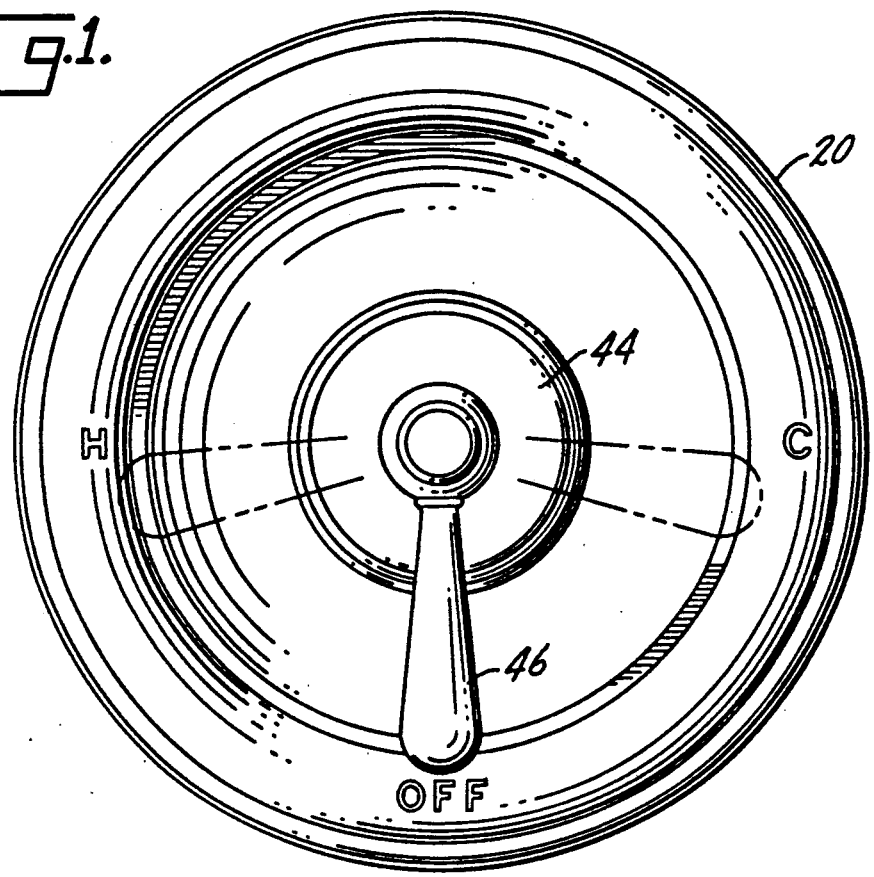
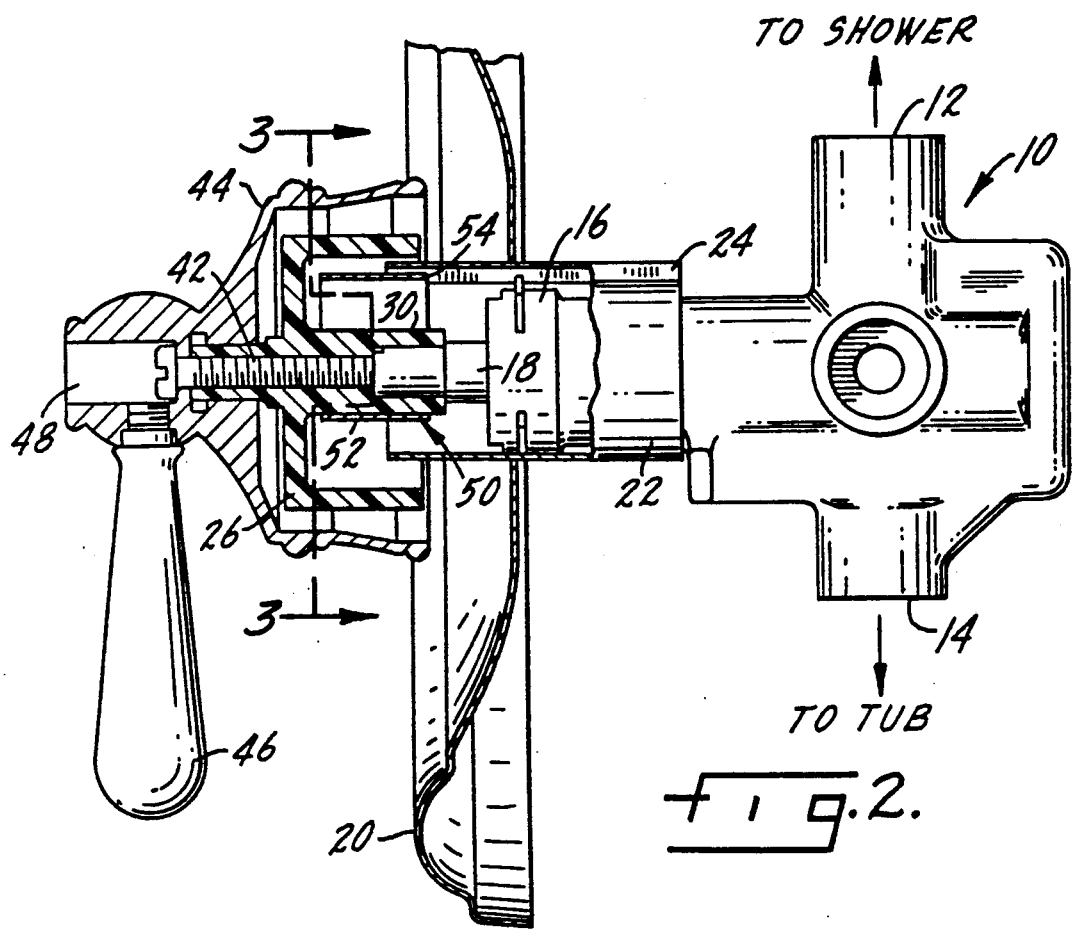

MIXING FAUCET ROTARY BRAKE

SUMMARY OF THE INVENTION

The present invention relates to control valves for plumbing fittings, for example shower valves, and is particularly concerned with a device for retarding movement of the control valve stem so that it will remain in an adjusted position.

A primary purpose of the invention is to provide a brake or retarding member which frictionally resists movement of the handle and valve stem of a control valve so that these elements will remain in a particular water temperature adjusted position.

Another purpose is to provide a simply constructed reliably operable control valve including a friction brake for resisting unwanted movement of the valve stem.

Other purposes will appear in the ensuing specification, drawings and claims.

BRIEF DESCRIPTION OF THE DRAWINGS

The invention is illustrated diagrammatically in the following drawings wherein:

FIG. 1 is a front view of a shower control valve showing the handle in an off position and in phantom line open positions, FIG. 2 is an enlarged partial axial section through the control valve illustrated in FIG. 1.

DESCRIPTION OF THE PREFERRED EMBODIMENT

Figure 3:
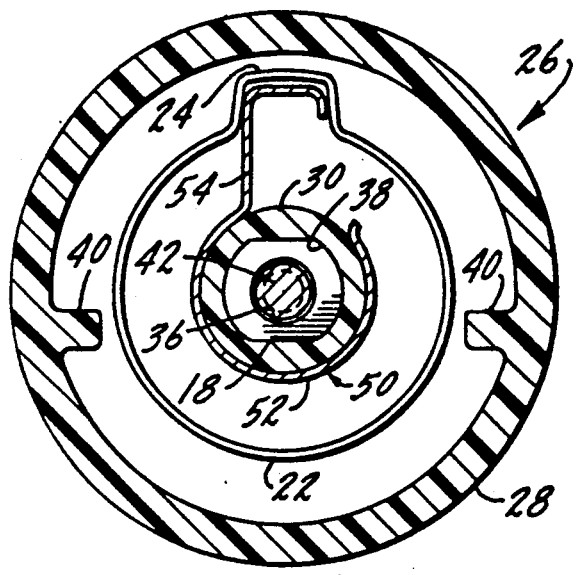
FIG. 3 is a section along plane 3—3 of FIG. 2.

The present invention is concerned with control valves, specifically those found in shower stalls and in kitchen or lavatory sinks. The invention will be described in connection with a single handle mixing valve sold by the assignee of the present application, Moen Incorporated, under the trademark "1225". The invention is equally applicable to other types of mixing valves and to non-mixing control valves, such as the two handle valve combination used in many faucet and shower installations.

The MOEN 1225 valve has a valve stem which both rotates to control water temperature and is movable axially to control water volume. In some applications, particularly in a shower or tub installation, the valve may only rotate. Present-day plumbing designs utilize control valve handles which may have substantial weight, with the majority of that weight being located at the outer end of the handle. Because the MOEN 1225 mixing valve and other types of mixing valves rotate with very little applied effort, it has been found that with such a valve and a handle with substantial weight, particularly at the end of the handle, the valve self adjusts or will move from a particular adjusted position to where the valve handle is generally vertically oriented, solely because of the weight of the valve handle and the ease of movement of the valve stem. The present invention overcomes this problem by providing a brake or means for retarding movement of the valve stem and handle. The handle will still be relatively easy to move so as to not require substantial effort to adjust water temperature, but it will not be so easy to move that it will self adjust.

In the drawing, a valve housing is indicated at 10 and this may be the type of housing used in a shower/tub installation. Housing 10 has an outlet 12 which will direct water to a conduit which connects to the shower and a tub outlet 14. Positioned within the housing is a mixing valve which may be of the type manufactured and sold by Moen Incorporated under the trademark "1225". Such valve is indicated at 16 and is positioned within the housing. Valve 16 has an operating stem 18 which rotates to control water temperature and which may reciprocate to control volume, although in some applications the valve stem will only have rotary movement. The housing 10 will be mounted just behind the wall of the shower, with the opening in the shower being masked by a decorative escutcheon 20.

A stop tube 22 may be mounted on that portion of the housing mounting mixing valve 16, with the stop tube being made of metal and having relatively thin walls, as indicated particularly in FIG. 3. Stop tube 22 has a radial projection 24 which, as the name implies, serves as a stop to limit rotation of the stem 18 of the mixing value.

Figure 4:
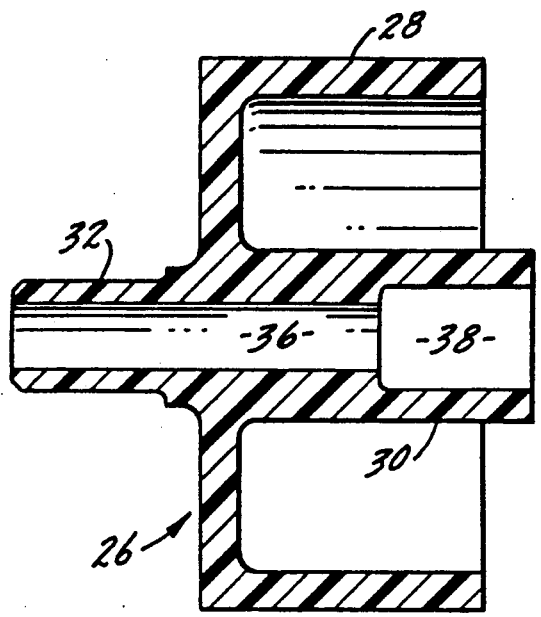
FIG. 4 is an axial section through the handle adapter.

Attached to stem 18 is an adapter 26 which, as shown in FIGS. 3 and 4, has a cylindrical outer portion 28 and an inner tubular portion 30, with the portion 30 terminating in an outwardly extending boss 32. A bore 36 extends through the length of the adapter and has an enlarged area 38 within which is positioned valve stem 18. The interior of adapter 28 has a pair of inwardly directed stops 40 which cooperate with stop tube projection 24 to limit rotation of the adapter, stem and handle assembly, as described hereinafter.

Mounted to adapter 26 by a fastener 42 is a decorative handle 44 having a handle member 46. The handle member 46 tapers from its center axis of rotation outwardly toward the end so that a major portion of the weight of the handle is at the end and is at a substantial distance from the axis of rotation. Handle 44 has a bore 48 within which is positioned fastener 42 which attaches the handle to the adapter and to valve stem 18.

As particularly shown in FIG. 3, a spring clip 50 has a cylindrical portion 52 which is in rotary sliding contact with the exterior of tubular portion 30 of the adapter. The spring clip has a hook-like projection 54 which extends into the interior of stop tube projection 24. Spring clip 50 cannot rotate, as it is fixed in position by the interengagement of hook portion 54 and stop tube projection 24. The interior of the cylindrical portion of spring clip 50 is in frictional engagement with the exterior of tubular portion 30, providing frictional resistance to movement of the handle assembly and valve stem. This frictional resistance is not at a level which would require undue force to rotate the valve stem, but is enough to prevent the valve stem from being moved by the weight of the handle.

In use handle 46 will be moved from the central "off" position to either a cold or hot position in which the handle is at a position slightly more than 90 degrees or at a position slightly less than 270 degrees. These positions are shown in dotted lines in FIG. 1. Without the brake or frictional resistance member 50, the weight of the handle has been found to be sufficient to move the valve stem away from a particular water temperature adjusted position. This self adjustment is undesirable, as it may take place during the time that a person is in the shower. To overcome such a condition, spring clip 50, which is metal, is in frictional resistance contact with the exterior tubular portion 30 which may be plastic or metal. The resistance to movement caused by the friction between these elements is sufficient to maintain the handle 46 in any adjusted position.

Figure 5:
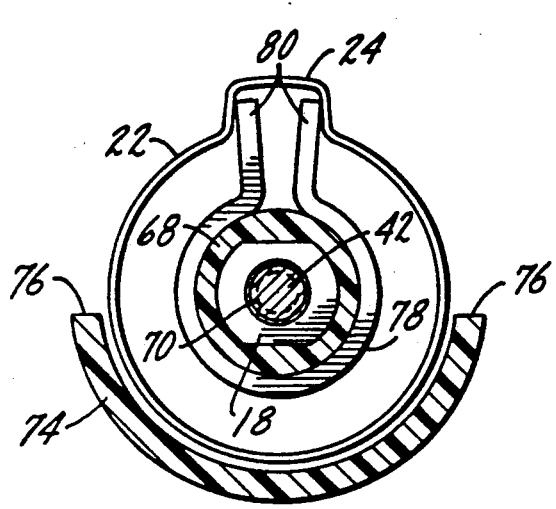
FIG. 5 is a front view of a modified form of handle adapter and spring clip.
Figure 6:
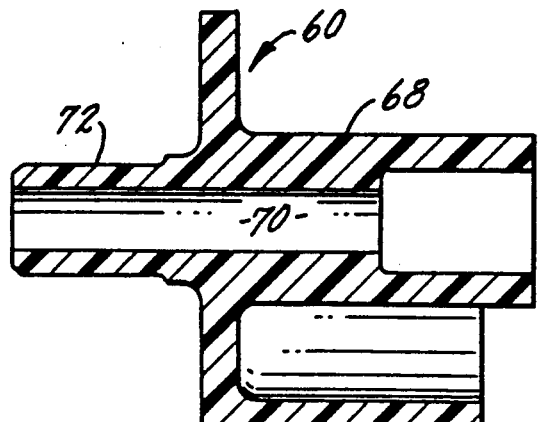
FIG. 6 is an axial section through the adapter of FIG. 5.
Figure 7:
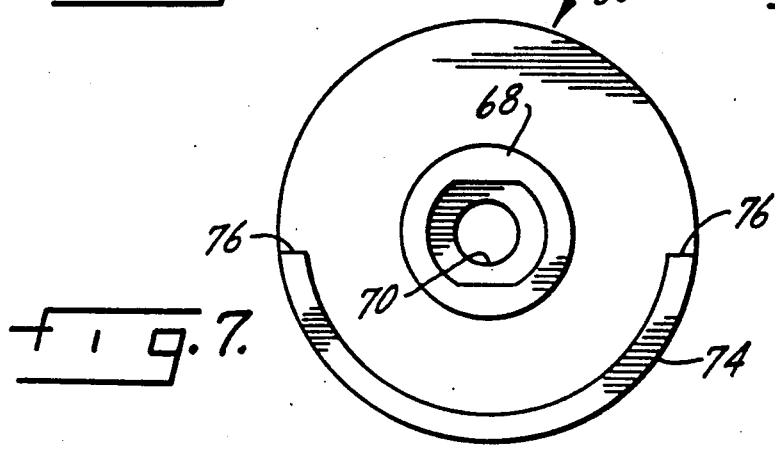
FIG. 7 is a rear view of the handle adapter of FIG. 6.

FIGS. 5, 6 and 7 show a modified form of adapter and spring clip which functions in the same manner as the adapter spring clip combination of FIGS. 1-4. In the FIG. 5, 6 and 7 embodiment, the adapter 60 has a tubular portion 68 with a bore 70. The adapter has an outwardly extending boss 72 which mounts the handle. The cylindrical portion 74 does not extend completely about the circumference of the adapter, rather, as shown in FIG. 7, it is slightly less than 180 degrees in arcuate extent. The ends 76 of the cylindrical portion function as stops to coact with projection 24 of the stop tube. Spring clip 78 encircles the tubular portion 68 of the adapter, as in the earlier described embodiment, but has a pair of projecting arms 80 which extend into the recess formed by stop tube projection 24. The principal difference in the FIG. 5, 6 and 7 embodiment is the different shape of the adapter and the fact that a portion of the cylindrical portion provides the necessary temperature stops. Also, the spring clip is different in that it does not have a hook which is positioned within the stop tube projection, but rather has the two ends of the spring member so positioned.

Whereas the preferred form of the invention has been shown and described herein, it should be realized that there may be many modifications, substitutions and alterations thereto.

The embodiments of the invention in which an exclusive property or privilege is claimed are defined as follows:

1. A control valve for use in plumbing fittings including a housing, a valve member within said housing and having a rotatable valve stem extending outwardly therefrom, handle means attached to said stem and rotationally movable therewith, cooperating stop means on said handle means and housing limiting rotation of said stem, and means for retarding rotational movement of said handle means and stem relative to said housing, including a spring member in frictional engagement with a portion of said handle means and fixed against rotation by said housing.

2. The control valve of claim 1 further characterized in that said handle means includes an adapter and an exterior handle, said adapter including stops limiting rotation of said stem.

3. The control valve of claim 2 further characterized in that said adapter includes a tubular portion extending over said valve stem, said retarding means including a spring clip in frictional engagement with the exterior of said tubular portion and fixed against rotation by said housing.

4. The control valve of claim 3 further characterized in that said spring clip includes a cylindrical portion extending about the tubular portion of said adapter and an end portion which is locked in position by said housing.

5. The control valve of claim 4 further characterized by and including a stop tube attached to said housing and having an outwardly extending projection which cooperates with the adapter stops to limit rotation of said stem, said spring clip end portion extending into said stop tube projection.

6. The control valve of claim 5 further characterized in that said spring clip end portion is in the shape of a hook.

7. The control valve of claim 5 further characterized in that said spring clip end portion is formed by two spaced end members integral with the clip and positioned within the projection of the stop tube.

* * * * *